July 16, 1968 A. GATTUSO 3,392,734

CARD SYSTEM

Filed Sept. 12, 1966 2 Sheets-Sheet 1

INVENTOR.
ANDREW GATTUSO
BY
Attorney

INVENTOR.
ANDREW GATTUSO
BY Samuel Cohen
Attorney

United States Patent Office 3,392,734

Patented July 16, 1968

3,392,734

CARD SYSTEM

Andrew Gattuso, Northridge, Calif., assignor to Radio Corporation of America, a corporation of Delaware Filed Sept. 12, 1966, Ser. No. 578,549

3 Claims. (Cl. 129—16.1)

ABSTRACT OF THE DISCLOSURE

An arrangement for helping to prevent withdrawal, from a pack of cards, of two cards at the same time. A pointed element is located in a notch in the pack of cards with the point facing the direction opposite to the card ejection direction. A card which clings to a selected card and which it is desired not to eject from the pack, catches on the pointed element and is held in place in the pack whereas the selected card, which is in a slightly shifted position relative to the clinging card, passes over the pointed element and is withdrawn from the pack.

This invention relates to an arrangement for helping to prevent the withdrawal, from a pack of cards, of two cards at the same time. The invention is useful, for example, in a card memory system.

In Patent No. 3,266,497, issued Aug. 16, 1966, to Lewis W. Bleiman, a memory system is described in which information is stored on cards. These cards are relatively thin, flexible, plastic sheets coated with magnetic material. The cards are coded at their upper and lower edges and are stored in packs in a magazine. A card is selected from a pack by pushing a group of the cards including the one desired out of the pack, gripping that card, and returning the remaining cards to the pack. The selected card is then moved through an opening in the magazine and into a passageway where the card is propelled by rollers and belts toward a read-write station.

In the system discussed briefly above, only one card is desired to be withdrawn from a magazine at a time. However, occasionally an unwanted card adheres to the selected card and is dragged out of the magazine along with the selected card. This is undesirable because, among other things, the two cards cannot simultaneously be processed and must be detected and stopped to prevent damage to the cards and equipment.

The object of this invention is to provide an improved means for lessening the tendency of multiple card selections to occur.

In the arrangement of the invention, an element is located in a notch at an edge of the pack cards in a magazine. The element is of pointed cross-section with the point facing the direction opposite to the card eject direction. The selected card is somewhat higher than the remaining cards in the pack and when it is moved out of the pack it passes over this pointed element. If an unwanted card adheres to the selected card and moves in the card eject direction, an edge of this unwanted card located within its notch catches on the pointed element, and this prevents the unwanted card from moving in the card eject direction.

The invention is discussed in greater detail below and is shown in the following drawings of which:

Figure 1:
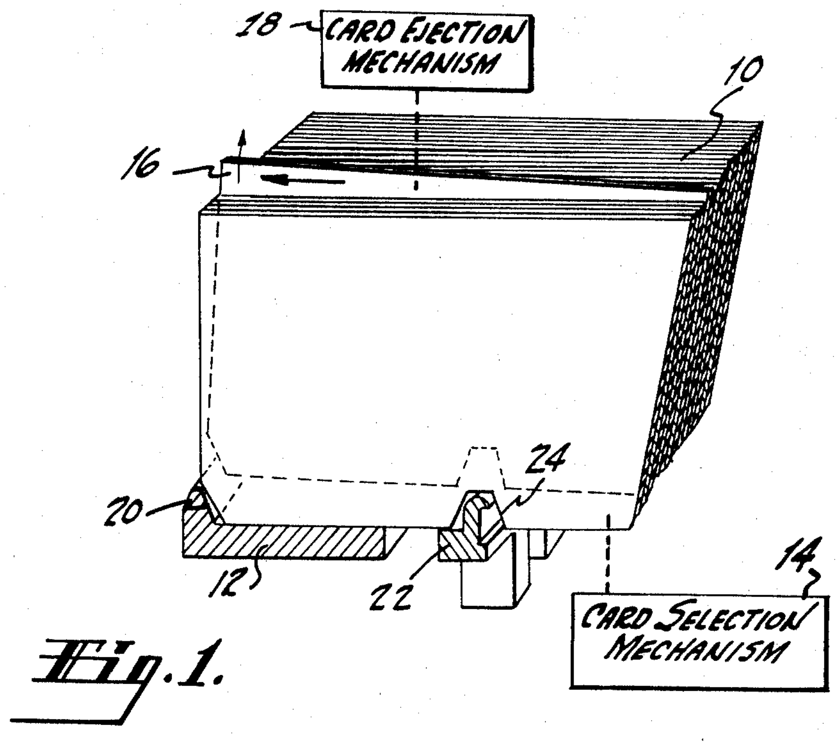
FIGURE 1 is a partially schematic, perspective broken-away view of the arrangement of the invention.

A pack of information storage cards is shown in part at 10 in FIGURE 1. The bottom of the pack of cards rests on the floor of a card magazine and the bottom front portion of this magazine is shown at 12. As indicated in the patent above, a card is selected by pushing a group of the cards out of the deck, gripping one of the cards with a gripper bar and pushing the remaining cards in the group back into the deck. (In FIGURE 1, the card selection means is illustrated schematically by the block 14.) The selected card, shown at 16, is then ejected from the magazine by the card ejection mechanism illustrated by the single block 18. The latter includes means for moving the gripper bar (which is still holding the selected card) to the left, as viewed in FIGURE 1, until the selected card is engaged by drive rollers (not shown here but illustrated in the patent above) and is propelled by these rollers into the raceway.

It sometimes occurs that a card immediately adjacent to the selected card adheres to the selected card. In general, this does no harm since, when the gripper bar is moved to eject the selected card, the adhering card, which is lower down in the pack than the selected card, abuts the shoulder 20 and this shoulder holds this card in place in the pack. Occasionally, however, the temporary bond between the selected card and the one adhering thereto is so strong that the adhering card is actually dragged over shoulder 20 and is ejected along with the selected card.

Figure 3:
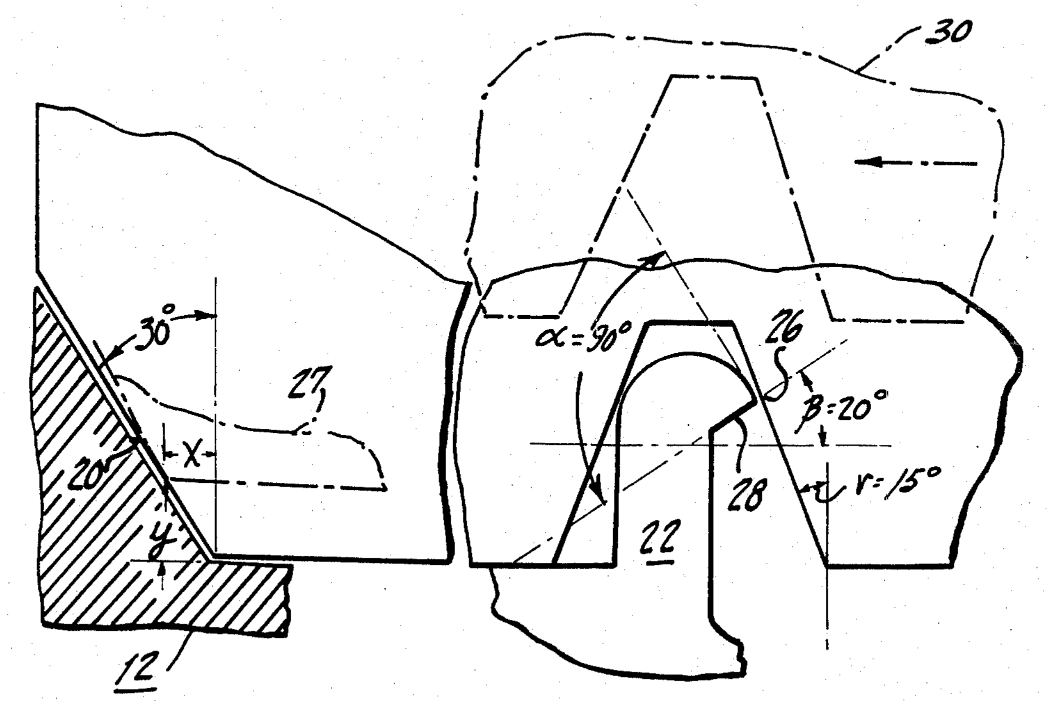
FIGURE 3 is an enlarged, broken-away plan view of the arrangement of the invention.
Figure 4:
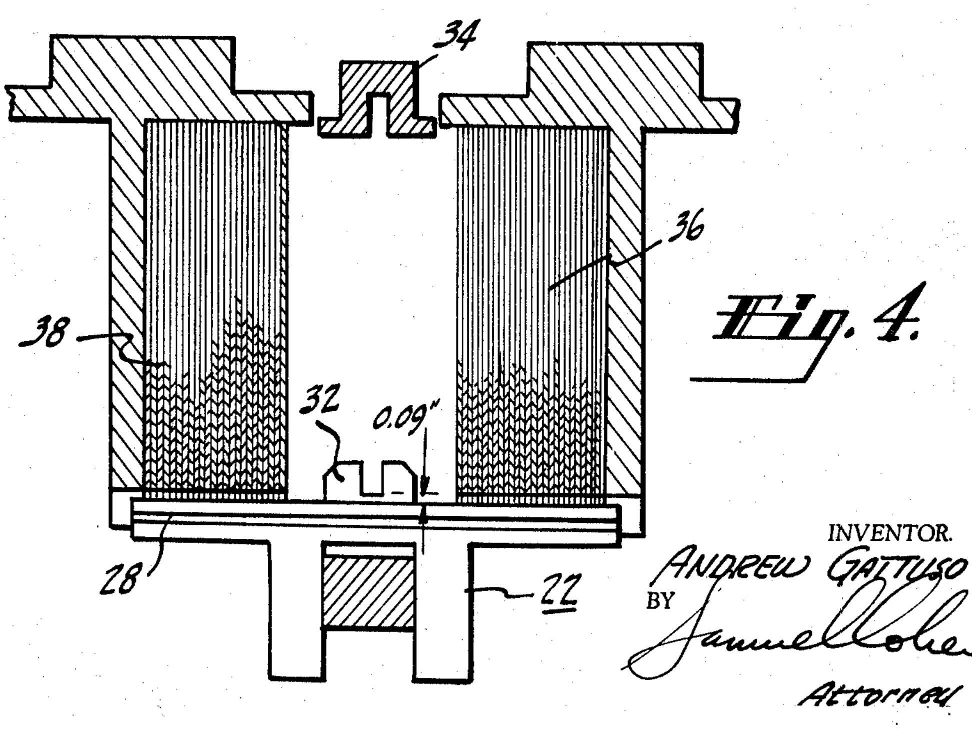
FIGURE 4 is a cross-section through a card magazine showing the arrangement of the invention.

The undesired selection of multiple cards is prevented, according to the invention, by a pointed element 22 which is located in a notch 24 in the cards and which extends over the entire width of two packs of the cards, as illustrated in FIGURE 4. If an unwanted card adheres to the selected card and attempts to move out of the magazine, the pointed end 26 (see FIGURE 3) of element 22 engages the notched portion of the card and the card cannot be withdrawn.

FIGURE 3 illustrates some of the parameters which must be considered in the design of the element 22. The notch in which the element 22 is located is cut at an angle $\gamma=15°$ with respect to the short edge of the card. The front rest 12 for the leading edge of the card is at an angle of 30° with the vertical. If an unwanted card adheres to the selected card it may tend to be moved upward through a distance $y$ and forward (to the left in FIGURE 3) a distance $x$. This card is shown, in part, in phantom view at 27 and the $x$ and $y$ dimensions are illustrated. The dimension $x$ should be larger than the initial spacing between the point 26 of the element 22 and the inner edge of the notch, to be certain that the point 26 engages the card before the card clears the front shoulder 20. With the rounded configuration employed for the top surface of element 22 (the reasons for which are given below), the 15° notch angle and for other reasons it is found that the angle $\beta$ should not exceed 30° to insure an initial spacing such as this.

The angle $\beta$ should be greater than 15° so that the point 26 will catch the edge of the card. If the angle $\beta$ is less than 15°, the inner edge of the notch of an unwanted card adhering to the selected card will engage the rounded portion of element 22 rather than the point because of the 15° angle $\gamma$ made by the notch edge.

The considerations above require that the angle made by the point of element 22, with respect to the horizontal, be greater than 15° and less than 30°. The value of 20° shown has been found to give the desired performance.

The angle $\alpha$ is chosen to be 90° for a number of reasons including ease of machining and appropriate shape of the top surface to perform the card guiding function discussed below.

A card returning to the magazine does not strike the element 22. Such a returning card is illustrated in phantom view at 30 in FIGURE 3. The bottom edge of this card rides in the lower channel 32 shown in FIGURE 4, and the upper edge of the card rides in the upper channel 34. The bottom of the lower channel is 0.09 inch above the top of element 22 so that the returning card cannot possibly hit the element 22.

After the card returns to the magazine, the lower channel 32 drops and an element (not shown in FIGURE 4) abuts the top edge of the card and pushes the card down until it is aligned with the cards in packs 36 and 38. The rounded upper surface of the element 22 of FIGURE 3 acts as a guide for this card as it is moved downward.

After the card is in its downward position, aligned with the decks 36 and 38, a card transfer plate moves the card from a position centered between the two packs, to the right or left as viewed in FIGURE 4, until the card abuts the cards in one of the packs. The element 22 acts as a guide for the card during such movement.

Figure 2:
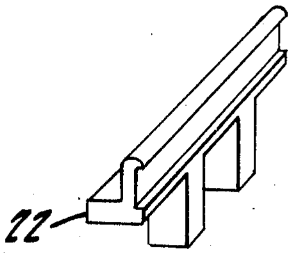
FIGURE 2 is a perspective view of the element for preventing an unwanted card from being withdrawn from the magazine.

Neither the push-down means nor the transfer plate for moving the card into a pack, per se, are part of the present invention and are not illustrated here. They are, however, shown in Patent No. 3,266,798, issued Aug. 16, 1966, to Lewis W. Bleiman. The card push-down element is illustrated at 48 in FIGURE 1 and transfer plates are shown at 30 in FIGURE 1 and at 30 and 32 in FIGURE 2.

What is claimed is:

1. In a system which includes a pack of cards, each card formed with a notch in the same position at one edge thereof and which also includes means for moving one card slightly out of the pack to a position such that it clears the notches in the remaining cards in the pack, and means for propelling the card sideways to eject it from the pack, the improvement comprising: an element located in the notch of all cards, in the initial position of the cards, and formed with a point which faces the direction opposite that of the ejection direction, for engaging the adjacent edge defining one side of the notch of any card which adheres to and attempts to move with the card moved slightly out of the pack when the latter is propelled in the card ejection direction, said adjacent edge of the notch being at an angle of 90 degrees plus $\gamma$ to the edge of the card in which the notch is formed, the point of said element being formed by two surfaces of said element, one surface facing the notch and the other surface facing in the general direction of the opening of the notch, said other surface being at an acute angle, somewhat less than 90°, with said adjacent edge of the notch the element is adapted to engage, and wherein there is an angle $\beta$ not more than 30 degrees between said other surface of said element and the edge of the card in which the notch is formed, where $\gamma$ is smaller than $\beta$.

2. The apparatus claimed in claim 1, wherein said one surface of said element facing said notch is curved.

3. The apparatus of claim 2, wherein the angle formed by said two surfaces is approximately 90° at said point.

References Cited

UNITED STATES PATENTS

| | | | |
|---|---|---|---|
| 1,889,635 | 11/1932 | Casey | 129—16.1 |
| 3,266,497 | 8/1966 | Bleiman | 129—16.1 |
| 3,292,631 | 12/1966 | Cross | 129—16.1 |

FOREIGN PATENTS

| | | |
|---|---|---|
| 829,953 | 5/1938 | France. |

JEROME SCHNALL, *Primary Examiner.*